US006772634B2

(12) United States Patent
Ibey

(10) Patent No.: US 6,772,634 B2
(45) Date of Patent: Aug. 10, 2004

(54) CONDUIT END IDENTIFIER SYSTEM

(76) Inventor: Jerry A. Ibey, 8802 Watson Ave., Whittier, CA (US) 90605

( * ) Notice: Subject to any disclaimer, the term of this patent is extended or adjusted under 35 U.S.C. 154(b) by 207 days.

(21) Appl. No.: 09/968,184

(22) Filed: Oct. 1, 2001

(65) Prior Publication Data

US 2003/0061881 A1 Apr. 3, 2003

(51) Int. Cl.⁷ .............................................. G01N 29/24
(52) U.S. Cl. .............................. 73/596; 73/632; 73/623; 73/622
(58) Field of Search .......................... 73/596, 597, 599, 73/622, 623, 632

(56) References Cited

U.S. PATENT DOCUMENTS

| 4,234,942 A | * 11/1980 | Prause et al. | 367/128 |
| 4,494,224 A | * 1/1985 | Morrell et al. | 367/99 |
| 4,584,676 A | * 4/1986 | Newman | 367/902 |
| 4,934,478 A | * 6/1990 | Melocik et al. | 367/136 |

FOREIGN PATENT DOCUMENTS

| EP | 249689 | * 12/1987 |
| EP | 296392 | * 12/1988 |

* cited by examiner

Primary Examiner—Robert Raevis
Assistant Examiner—Nashmiya Fayyaz
(74) Attorney, Agent, or Firm—Chris Papageorge

(57) ABSTRACT

The system provides a means for identifying the opposite ends of each particular conduit of an array of conduits laidout in a building. The system includes a sonic transmitter and a sonic receiver which are units that are separate from each other and portable. The transmitter is connected to a sonic output transducer mounted on a wand which semi-rigid allowing it to be placed at an open end of a conduit and emit a sonic signal thereinto and through the conduit. The receiver is connected to sonic input transducer mounted on another wand which is semi-rigid allowing it to be placed at the opposite open end of the conduit and receive the sonic signal transmitted through the conduit. The sonic transducers may be moved from one of the open ends to another in the array until the input transducer receives the transmitted signal. A visual and auditory indicator notifies the user of receipt of the signal by the receiver and thereby provides identification of those open ends as being the opposite ends of a particular conduit.

20 Claims, 6 Drawing Sheets

CONDUIT END IDENTIFIER SYSTEM

BACKGROUND OF THE INVENTION

The invention relates generally to systems for construction and renovation of buildings and, more particularly, to systems for facilitating the installation of interior electrical wiring in commercial and residential buildings. After conduit for the wiring has been installed in the buildings, the invention facilitates the identification of the conduit ends and thereby the determination of the location at which the conduits terminate or originate.

The amount of time expended and degree of difficulty of the task of installing electrical wiring in a building depends on proper installation of conduit for the wiring. But the conduit has been typically installed by another type of construction worker whose job goals and primary job focus are different from those of the electrical wiring installer. The conduit has been installed leading from and to various parts of the building depending on the particular needs for electrical devices and electrical outlets at various locations of the building as well as the particular location of the electrical power input for the building. Modern residential and commercial building utilize an ever increasing number of devices and systems which require electrical power. Thus, there are typically a large number of conduits each of which extend from at least one building location to various other locations. The conduits have one open end of each grouped together at the one location where, for example, the electrical power input for the building is located. It is common for there to be a large number of open ends at a single location and set up in an array for providing access to, for example, the electrical power input for the building. This usually makes them easily viewable and easily accessible for the worker who is to install electrical wiring therein. Often, these open ends will terminate in a single container such as, for example, a breaker box. But, the conduits may also be laid out so that their open end are not in any kind of container and simply unattached. All the conduits used for a single purpose are typically the same standard size and same material composition and also often unpainted so that they are visually indistinguishable from each other. In addition, due to time constraints there is often insufficient time during building construction to properly mark or tag conduits to identify where they branch out or at what locations they terminate. Consequently, to the installer of electrical wiring, the open ends of the conduits which are grouped together at, for example, the electrical power input all appear the same, and there is thus no pragmatic way of determining which conduit open ends lead to which areas of the building. As a result, the installer cannot visually determine which open end should receive the particular wiring intended for routing to particular areas of the building. Since each conduit may be one-hundred feet or more in length, it is time consuming and labor intensive to install wiring in the conduits. Each area of the building may have its own distinct requirement for a set of wiring of a particular length, size and number. Therefore, if the wiring set is not right for the particular conduit in which it has been mistakenly installed, the installer must remove that wiring set from the conduit and install the proper wiring set thereby expending time and labor which is essentially wasted.

Various ways of expeditiously determining which conduit open end is a part of the which opposite open end situated at various locations of the building. One such method requires two persons to work together as a team. This method requires one person situated at one open end talking thereinto and another person situated at the other open end listening for his voice. However, this method has the disadvantage of requiring the use of two persons whereas the remainder of the work of installing wiring requires only one person. Also, it may be difficult to both find another available worker and add another worker solely for the purpose of conduit identification. In addition, adding another worker solely for that limited task may involve a financial cost which may be excessive considering the amount of time contributed by that added worker. Also, it may be unduly burdensome to take time out from one's normal work to provide adequate briefing to that other worker about the task specifics including purpose, background and hazards. Consequently, this method may be unduly time consuming.

Another prior art method also requires two persons working together as a team. One person feeds a fish tape into and through a particular conduit until it comes out of the other end of the conduit. However, if there are many bends in the conduit, the tape may get hung up inside the conduit requiring more time and trouble to get it past the site of the hang up. In addition, such a method may be dangerous if the metal tape feeds out into a live electrical circuit box. Moreover, as with the other method, this method is time consuming and labor intensive.

Some prior art methods for locating a pipe use a signal. An example of such a system is that disclosed in U.S. Pat. No. 4,233,561 to Haddon. The Haddon system uses a means of generating an electrical signal into a pipe in order to locate a pipe. However, the Haddon system does not directly attach to or mount at a pipe and thus is not able to identify the respective ends of a particular pipe. Moreover, such a system may be dangerous or otherwise result in damage in instances where the pipe is part of an electrical system or closely adjacent to an electrical device or circuit. Moreover, such a system requires that the pipe be electrically conductive and therefore may not be utilized in many pipe systems.

Another prior art system for locating a pipe utilizes an audio signal. An example of such a system is that disclosed in U.S. Pat. No. 3,975,735 to McCullough. The McCullough system uses an audio signal generating means and a sensor for receiving the signal. But, the McCullough system is designed to emit a signal through the walls of a metallic discharge pipe in order to locate the joint of a drain pipe and discharge pipe. Thus, since this type of system cannot send a signal through the entire length of the pipe it cannot be used for pipe end identification. Moreover, the McCullough system is not attached to or mount at the ends of a pipe but instead must be inserted relatively far into the pipe and thus is not designed to locate or identify the respective ends of a pipe.

Another prior art system for locating a pipe is that of Ptashinski disclosed in U.S. Pat. No. 4,915,055. The Ptashinski invention is uses a permanently mounted physical structure in an end of the pipe for locating the pipe when the pipe is overlaid with concrete while leaving the physical structures exposed. Visual observation of the physical structures provides the means for locating the pipe. However, this type of device cannot be attached and detached from a plurality of pipes and so cannot pragmatically be used to locate the respective ends of a particular pipe when in a group of pipes.

Other prior systems for locating a pipe use a transmitter antenna and receiver antenna. Such a system is disclosed in U.S. Pat. No. 3,653,050 to Eggleston. The Eggleston system uses an antenna attached to a cable for inserting the antenna into a hole drilled into a structure supporting a pipe. Transmission of electromagnetic energy through the pipe results in a signal which is picked up by a receiver connected to the antenna in the hole. However, this type of system is not designed to transmit a signal completely through the entire length of a pipe and thus not designed to locate the respective ends of a particular pipe.

What is therefore needed is a system that can be quickly and effectively used by a single worker to identify the respective ends of each of a plurality of conduits. In addition, such a system is needed especially when the conduits and ends thereof are identical in size, shape and color and grouped together so that they are visually indistinguishable. A system for conduit end identification is also needed that is portable and that can safely be used in a locale in which exposed electrical circuitry or systems pose a hazard to personal safety or building structures.

SUMMARY OF THE INVENTION

It is a principal object of the present invention to provide a system for identifying the respective ends of each of a plurality of conduits when the conduits and/or ends thereof are grouped together and are pragmatically otherwise indistinguishable.

It is another object of the present invention to provide a system for identifying the respective ends of each of a plurality of conduits when the conduits are embedded or otherwise concealed from view making identification of the ends with respect to the conduits thereof otherwise unfeasible.

It is also an object of the present invention to provide a system for identifying the respective ends of each of a plurality of conduits when the conduits extend for a long distance making visual discernment difficult and therefore identification of the ends with respect to the conduits thereof otherwise unfeasible.

It is also an object of the present invention to provide a system for identifying the respective ends of each of a plurality of conduits when the paths of the conduits are convoluted making visual discernment difficult and therefore identification of the ends with respect to the conduits thereof otherwise unfeasible.

It is an object of the present invention to provide a system for identifying the respective ends of each of a plurality of conduits without presenting an undue hazard in an area where there is otherwise risk of electrical discharge.

It is an object of the present invention to provide a system for identifying the respective ends of each of a plurality of conduits which can be used to perform its desired task by a single user.

It is an object of the present invention to provide a system for identifying the respective ends of each of a plurality of conduits which is self contained.

It is an object of the present invention to provide a system for identifying the respective ends of each of a plurality of conduits which is easy to use.

It is an object of the present invention to provide a system for identifying the respective ends of each of a plurality of conduits which can be effectively used in a noisy environment.

It is an object of the present invention to provide a system for identifying the respective ends of each of a plurality of conduits which can be effectively used simultaneously with other such systems at the same general location.

It is an object of the present invention to provide a system for identifying the respective ends of each of a plurality of conduits which can perform its desired function quickly.

It is an object of the present invention to provide a system for identifying the respective ends of each of a plurality of conduits which is relatively simple in construction and inexpensive to manufacture and use.

It is an object of the present invention to provide a system for identifying the respective ends of each of a plurality of conduits which requires minimal labor use.

It is an object of the present invention to provide a system for identifying the respective ends of each of a plurality of conduits which is relatively lightweight and portable.

The system of the present invention is designed to be used in buildings or other structures which have a number of conduits used to carry electrical wiring, fiber optic cable, natural gas, or other types of transmission lines. The conduits are usually contiguous and constructed without any significant breaks therein. Such conduits are commonly placed between walls or behind other building structures so that they are mostly concealed from view to avoid damage thereto or to something else or to avoid presenting an eyesore. They may be placed underground and constructed without breaks therein and without J-boxes. The conduits also may be placed at the ceiling or in another location in which they are far away from a person's easy reach. The result is that typically only the open ends of the conduits are in view and often even these open ends are not easily accessible. The system of the invention is specifically designed for use in the construction of such buildings after the conduits have been laid between the walls, underneath the floors or above the ceiling. In common construction layouts, one of the open ends of each conduit is grouped together with other open ends while the opposite open ends are situated at various locations in the building depending on the needs for electrical outlets, electrical fixtures, etc. The system of the invention is advantageously used to determine which conduit open end leads to which building location in order to select the wiring length, size and number to be fed into the open ends or to determine which wire loom or wire set is to be fed therein. The invention may also be used to check for errors made in laying the conduit by tracing the conduit open end to its opposite open end and thereby enable the user to determine if this is the proper location for that open end.

Basically, the system of the present invention uses a sonic signal which is transmitted into and completely through a selected conduit to determine which conduit open end is part of which conduit main body and of which of the other open ends. Since the conduits are usually contiguous and constructed without any significant breaks therein, they can allow transmission of a sonic signal therethrough without substantial dispersion of the signal through the walls of the conduit (and thereby into and through other adjacent conduits).

The invention includes a sonic generator and transmitter connected to a sonic emitter which is relatively small and lightweight and thus easily placed at one of the conduit open ends. The sonic signal radiated from the emitter is transmitted into the open end and through the conduit and comes out from the other open end of the same conduit. A sonic pickup which is also small and lightweight and thus easily placed at the other open end picks up the signal therefrom and feeds it to a receiver which activates an indicator providing an indication of receipt of the signal generated by the system and thereby identifying the open ends as part of the same conduit. By viewing the indicator, the user can quickly and easily determine where each of the open ends leads and thereby select the proper wiring for them. The invention thus enables accomplishment of the desired objective with minimal time expenditure.

The system of the invention can also be used to determine if any of the conduits are blocked as occurs sometimes due to dirt or concrete pieces becoming lodged in the conduit. If the emitted signal does not pass through the conduit, the conduit may be deemed to be blocked.

Both the sonic pickup and sonic emitter are movable relative to the transmitter and receiver to which they are connected allowing both the pickup and emitter to be positioned sequentially or selectively, as desired, at any or all of the open ends in order to transmit the signal into or receive the signal from the proper opposite open end. Thus, the pickup and emitter may be moved quickly and easily from one open end to another until the system indicator provides the desired visual or auditory output which identifies the selected open ends as being opposite and therefore part of the same conduit. Both the emitter and the pickup need not be attached to nor positioned at the selected open end at any special location relative thereto or at any special orientation relative thereto. It is only necessary that the emitter and pickup be positioned at the open end close enough and at such an orientation that the signal is directed predominantly into the selected open end or that the signal picked up is received predominantly from the selected open end. Thus, the system of the invention can accomplish its desired objective if the user simply is reasonably confident that the signal is going into or coming out of the selected open end rather than another open end proximal thereto.

Both the transmitter and emitter combination and the receiver and pickup combination are portable allowing them to be easily moved from one location to another in the building. In addition, the receiver and transmitter may be battery powered to enhance their portability. Their high degree of portability thus allows these units to be used in many different types of environments wherever conduit end identification is needed.

The receiver and transmitter are preferably relatively small so that they may be used in confined spaces. In addition, the emitter and pickup also are preferably small and utilize a relatively long connection line to their respective units so that they may be inserted into confined spaces such as containers that may hold the open ends. Additionally, the small size and long connection line allows them to be inserted well within the open ends, if desired. The connection lines are also preferably flexible allowing better maneuverability in placing the emitter and pickup in such confined spaces.

Neither the pickup nor the emitter need to be manually held after they are placed at the selected open end. Instead, these components need only be simply properly positioned at the open ends and may be left there while the system is turned on and its operation is commenced. Thus, the emitter and pickup need not be attended to for proper operation of the system. In addition, neither the open ends nor the conduit main bodies need to be altered, held, manipulated or touched for the proper operation of the system. Thus, one person may place the system components at the selected open ends, commence operation of the system and simply view and/or hear the results provided by the system indicator. Since a second person is not required, labor costs for use of the system are minimized.

Since the invention does not use any unshielded or uninsulated parts that may be likely to inadvertently come into contact with live electrical circuitry causing electrical shorting or shock, it is relatively safe to use and handle. In addition, the components of the invention are low power consumption units. The invention is thus relatively inexpensive to operate a well as relatively safe to use and handle.

DETAILED DESCRIPTION OF THE PREFERRED EMBODIMENT

Figure 1:
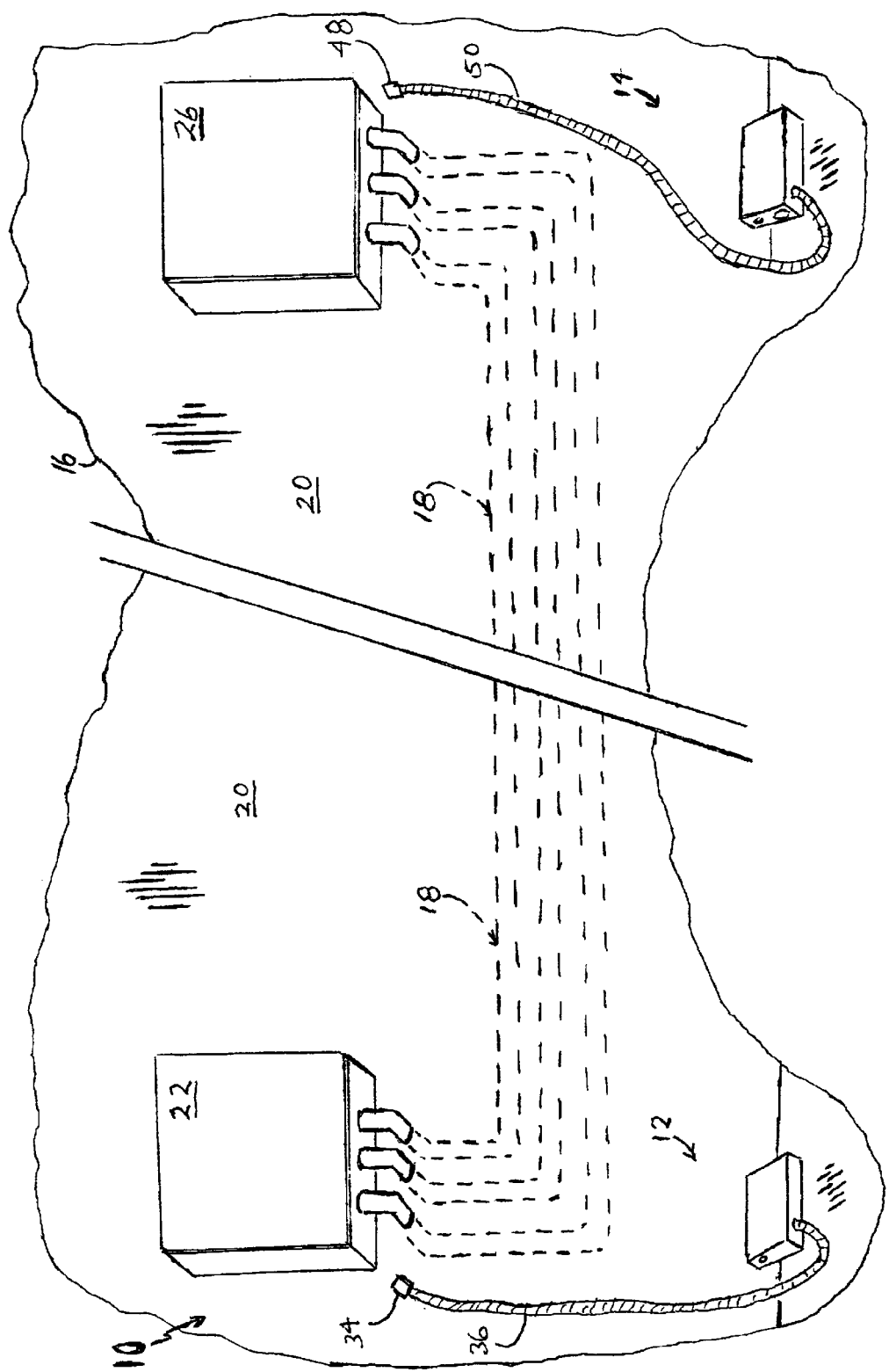
FIG. 1 is a perspective view showing the system of the invention placed at opposite ends of a conduit part of which is located within a wall of a building and therefore shown in phantom.

Referring to the drawings, the conduit end identifier system of the present invention is generally designated by the numeral 10. As shown in FIG. 1, the identifier system 10 has two subsystems, a transmitter subsystem 12 and a receiver subsystem 14. The subsystems 12 and 14 are physically separate from each other and not interconnected by any type of cable, wire, etc. Subsystems 12 and 14 can thus be separately moved and positioned wherever desired. In the particular system application depicted in FIG. 1, subsystems 12 and 14 are shown positioned within a building 16 having electrical wiring conduit 18 embedded within a wall 20. More specifically, subsystem 12 is positioned at a terminal box 22 housing the open ends 24 of the conduits 18 such that subsystem 12 is at those open ends 24, and subsystem 14 is positioned at a breaker box 26 housing the opposite open ends 28 of the conduits 18. Thus, FIG. 1 shows subsystems 12 and 14 in position for use in identification of the open ends 24 and/or 28 with respect to their opposite open ends and the conduits 18 of which they are part.

Figure 2:
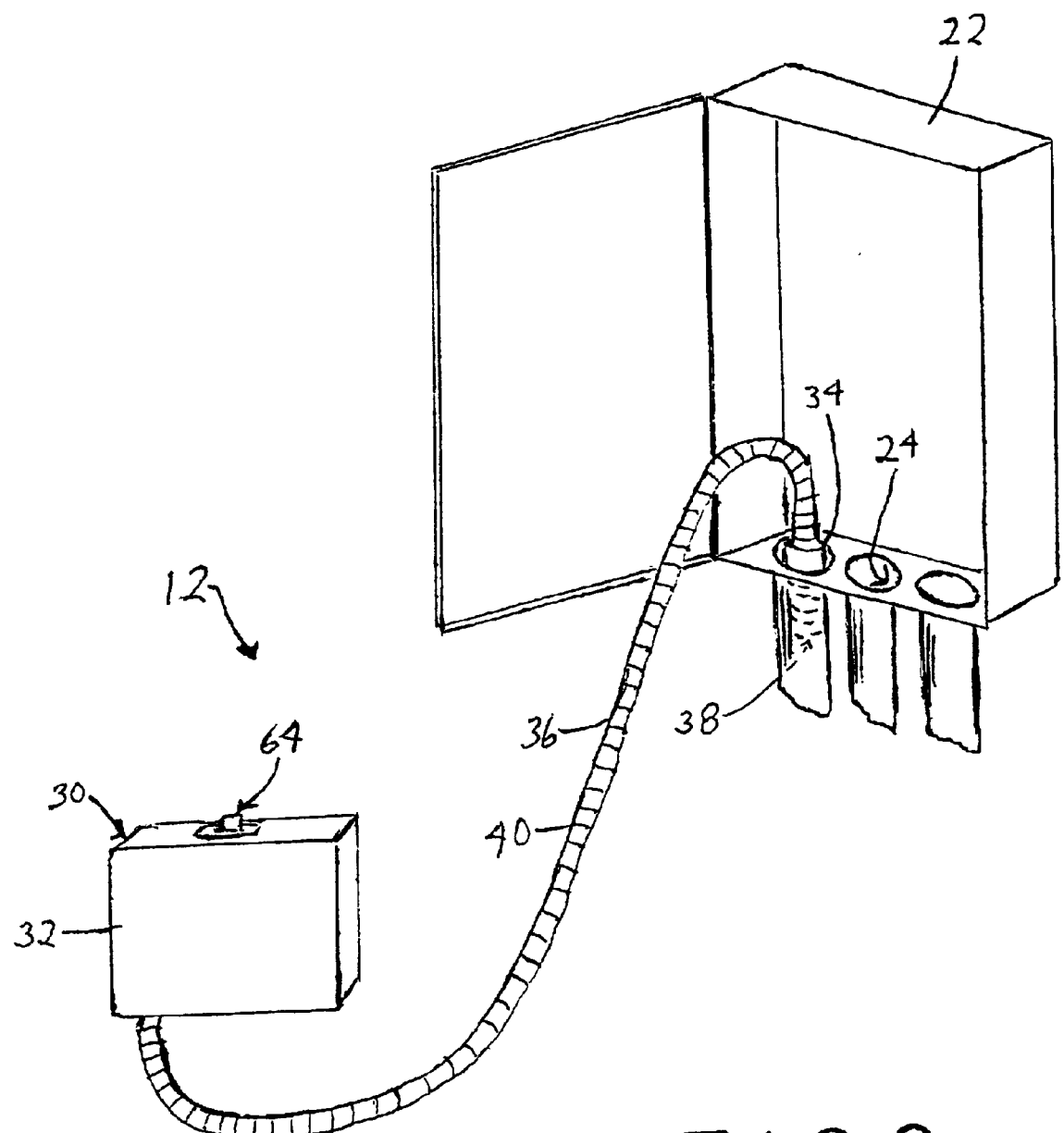
FIG. 2 is an isometric view of the transmitter and emitter of the system of the invention showing the open end partially broken away in order to illustrate the proper positioning of the emitter therein and also showing the sonic waves generated by the transmitter and radiated from the emitter into the open end of a conduit.

FIG. 2 shows subsystem 12 in more detail. Subsystem 12 includes a transmitter 30 having a housing 32 and an emitter 34 electrically connected to the transmitter 30 by means of electrical cables or interconnects 36. Optionally, however, such connection between the transmitter 30 and emitter 34 may be via wireless connection, for example, via radio frequency communication. Transmitter 30 preferably generates an electrical signal which is transmitted to the emitter or emitter transducer 34 which converts the electrical signal to a sonic signal 38 and radiates it therefrom. The signal 38 is preferably outside the range of human hearing and more preferably is ultrasonic. This enables it to be distinguished from the sounds that are commonly present in a building construction site and produced by such equipment as jackhammers, saws, drills, etc. Such construction site equipment typically produces noise that is low frequency and mostly audible.

Transmitter 30 and emitter 34 are preferably physically interconnected via a wand or tube 40. The emitter 34 is mounted at the outer end 42 of the wand 40. The wand 40 is preferably flexible to a limited degree and dimensioned to fit within a user's hand to enable the user to properly direct the emission of the sonic signal 38 from the emitter 34. The wand 40 is preferably long relative to the transmitter 30 and is preferably approximately twelve inches in length. The wand 40 is sufficiently flexible and sufficiently long that it allows the end 42 (and thereby the emitter 34) to be moved in all three dimensions relative to the transmitter housing 32. Yet, the wand 40 is also rigid or stiff to a limited degree so that it can be bent into various shapes and configurations and retain such shapes and configurations without being attended to. The emitter 34 is preferably approximately one-half inch in diameter. The emitter 34 may be somewhat larger than this but no more than fifty-eight hundreths of an inch in diameter. This relatively small size of the emitter 34 allows it to be easily inserted in conduits (for electrical wiring) which are of a standard size. As FIG. 2 shows, the emitter 34 may be simply inserted into the open end of the conduit and allowed to remain there unattended. However, the emitter 34 may alternatively be placed outside the open end 24 but sufficiently proximal thereto and oriented so that it is directed sufficiently toward the open end 24 that the sonic output 38 from the emitter 34 is radiated into predominantly that selected open end 24. The wand 40 is preferably composed of an electrically insulating material and the emitter 34 is preferably covered with an electrically insulating material (or the outer surface of emitter 34 may be composed of an electrically insulating material) to reduce the hazard associated with unintentionally coming into contact with electrical circuits, power lines or electrical devices.

Figure 3:
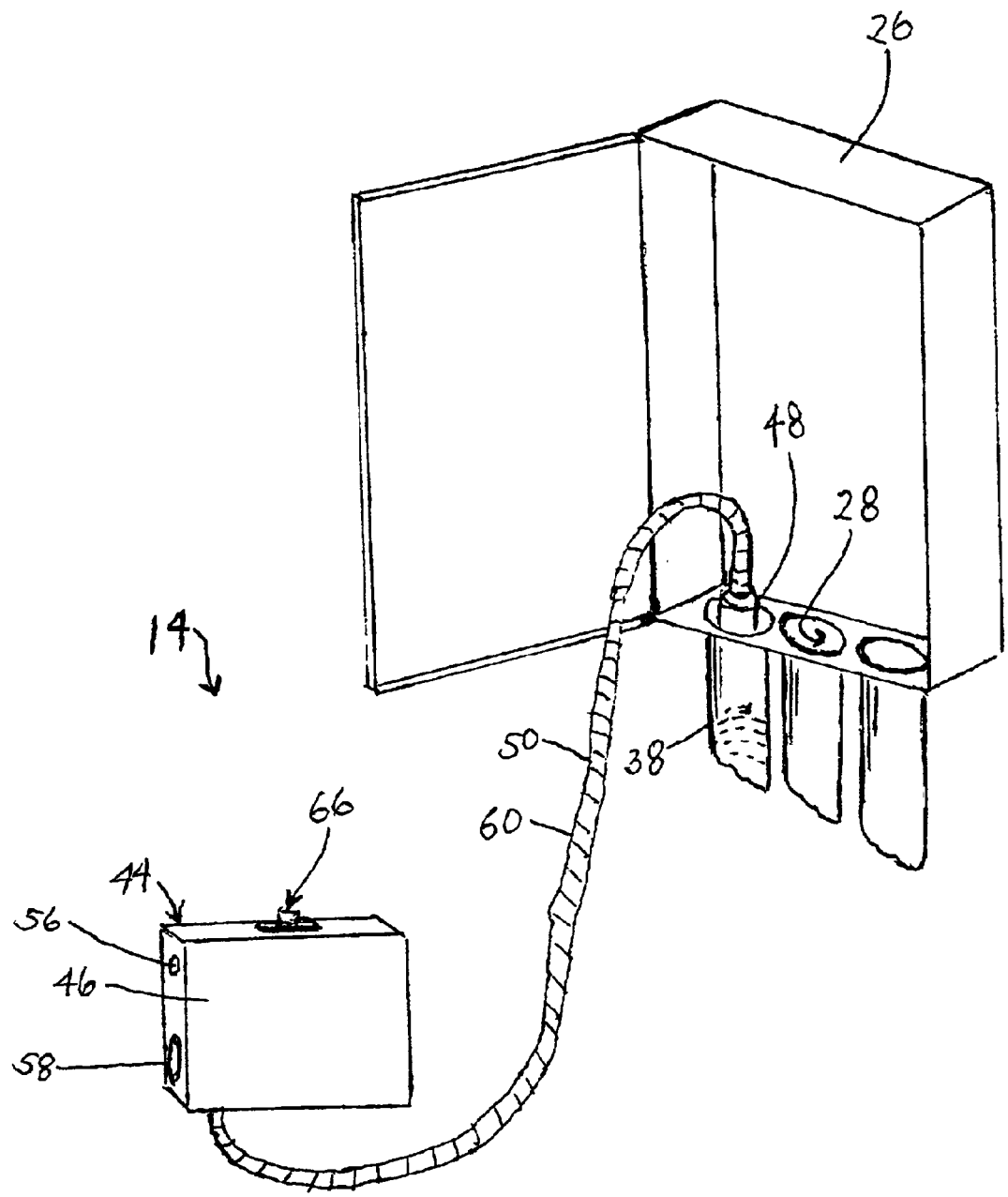
FIG. 3 is an isometric view of the receiver and pickup and indicator of the system of the invention showing positioned in the open end of a conduit also showing the sonic waves received by these components of the invention that are generated and emitted by other components.
Figure 4:
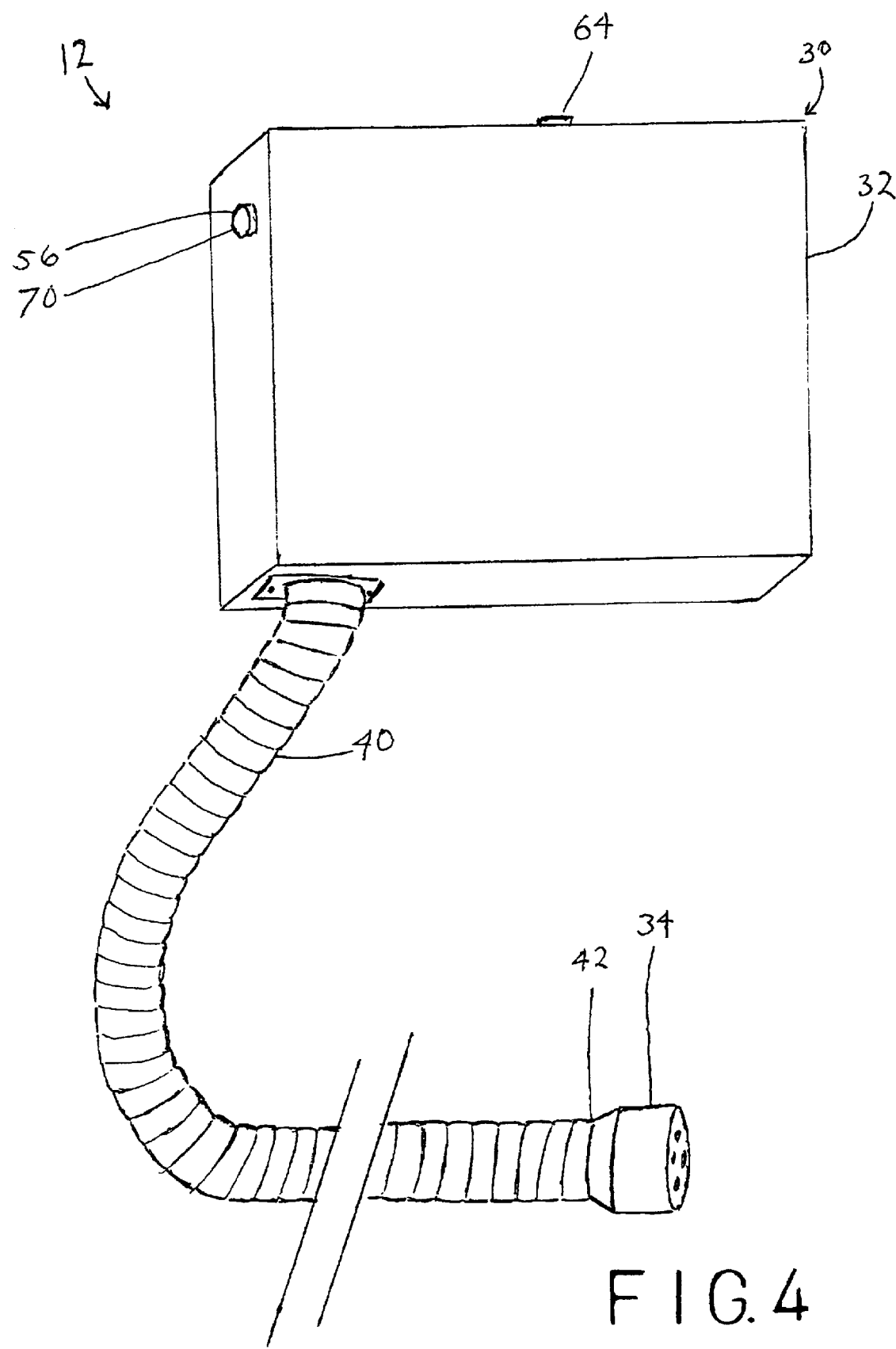
FIG. 4 is an isometric view of the transmitter and emitter components of the system of the invention showing these components in more detail.
Figure 5:
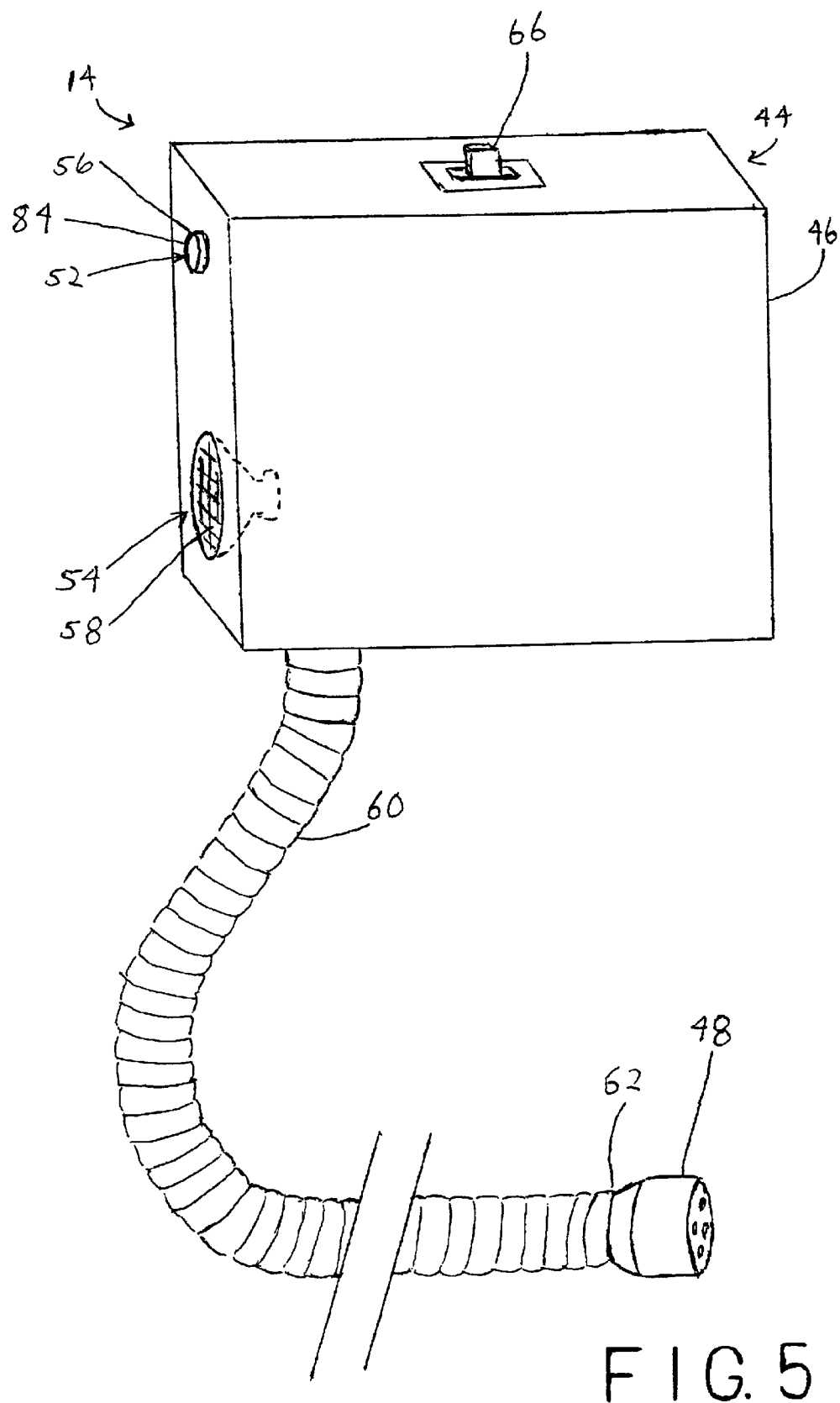
FIG. 5 is an isometric view of the receiver, pickup and indicator components of the system of the invention showing these components in more detail.

FIG. 3 similarly shows subsystem 14 in more detail. Subsystem 14 includes a receiver 44 having a housing 46 and an pickup 48 electrically connected to the receiver 44 by means of electrical cables or interconnects 50. Optionally, however, such connection between the receiver 44 and pickup 48 may be via wireless connection, for example, via radio frequency communication. The pickup or pickup transducer 48 preferably receives the sonic signal 38 and converts it to an electrical signal which is transmitted to the receiver 44. The receiver 44 processes the signal filtering out noise and determining if it is the signal produced by the transmitter 30. Upon recognizing that the signal is the desired signal, the receiver 44 provides an electrical output which is fed to a visual indicator 52 and an auditory indicator 54 activating them and thereby alerting the user that the signal has been received. The visual indicator 52 includes preferably an led 56 mounted on the receiver housing 46 which lights up when the signal is received, and the auditory indicator 54 preferably includes an audio speaker 58 mounted inside the receiver housing 46 which emits an audible beep when the signal is received.

Receiver 44 and pickup 48 are preferably physically interconnected via a wand or tube 60. The pickup 48 is mounted at the outer end 62 of the wand 60. The wand 60 is preferably flexible to a limited degree and preferably sized so that it fits within a user's hand and thereby enables the user to manually position the pickup 48 to properly receive the sonic signal 38. The wand 60 is preferably long relative to the receiver 44 and is preferably approximately twelve inches in length. The wand 60 is sufficiently flexible and sufficiently long that it allows the end 62 (and thereby the pickup 48) to be moved in all three dimensions relative to the receiver housing 46. Yet, the wand 60 is also rigid or stiff to a limited degree so that it can be bent into various shapes and configurations and retain such shapes and configurations without being attended to. The pickup 48 is preferably approximately one-half inch in diameter. The pickup 48 may be somewhat larger than this but no more than fifty-eight hundreths of an inch in diameter. This relatively small size of the pickup 48 allows it to be easily inserted in conduits (for electrical wiring) which are of a standard size. As FIG. 3 shows, the pickup 48 may be simply inserted into the open end of the conduit and allowed to remain there unattended. However, the pickup 48 may alternatively be placed outside the open end 28 but sufficiently proximal thereto and oriented so that it is directed sufficiently toward the open end 28 that the pickup 48 receives predominantly the signal, if any, that is radiated outwardly from that selected open end 28. The wand 60 is preferably composed of an electrically insulating material and the pickup 48 is preferably covered with an electrically insulating material (or the outer surface of pickup 48 may be composed of an electrically insulating material) to reduce the hazard associated with unintentionally coming into contact with electrical circuits, power lines or electrical devices.

Both the transmitter subsystem 12 and the receiver subsystem 14 are small enough and light enough that they may be moved manually to any desired suitable location. Both the transmitter housing 32 and the receiver housing 46 are preferably approximately six inches square and two inches thick and preferably made of a plastic composition to be lightweight as well as electrically nonconductive and therefore safe to handle when around electrical circuits and equipment that present an electrical hazard.

For operation of the system 10, the user places the transmitter subsystem 12 at, for example, the terminal box 22 sufficiently proximal thereto to allow the wand 40 to reach each of the open ends 24 in the box 22. The user places the emitter 34 into a selected one of the open ends 24 and adjusts its position via the semi-rigid wand 40, if necessary, so that it remains there unattended. The user turns on the transmitter 30 via on-off switch 64 which produces emission of the sonic signal 38 from the emitter 34 into that one of the open ends 24 and through its conduit. The user subsequently carries the receiver subsystem 14 to the other location where he believes the opposite open ends 28 of the conduit 18 are located which in this example is the breaker box 26. The user similarly places the receiver subsystem at the breaker box 26 sufficiently proximal thereto to allow the wand 60 to reach each of the open ends 28 in the box 26. The user places the pickup 48 into a selected one of the open ends 28 and adjusts its position via manipulating the semi-rigid wand 60 so that it remains there or simply manually holds it there, if so desired. The user turns on the receiver 44 via on-off switch 66. If he has selected the right one of the open ends 28, the led 56 lights up and the audio speaker 58 emits a beep. If the receiver subsystem 14 does not provide that indication, the user places the pickup into another one of the open ends 28 and waits for an indication of signal receipt therefrom. The pickup 48 is inserted into each one of the open ends 28 in turn and as needed until the indicators provide the desired response and that one of the open ends 28 which is opposite to that of the selected one of the open ends 24 is identified as such.

Figure 6:
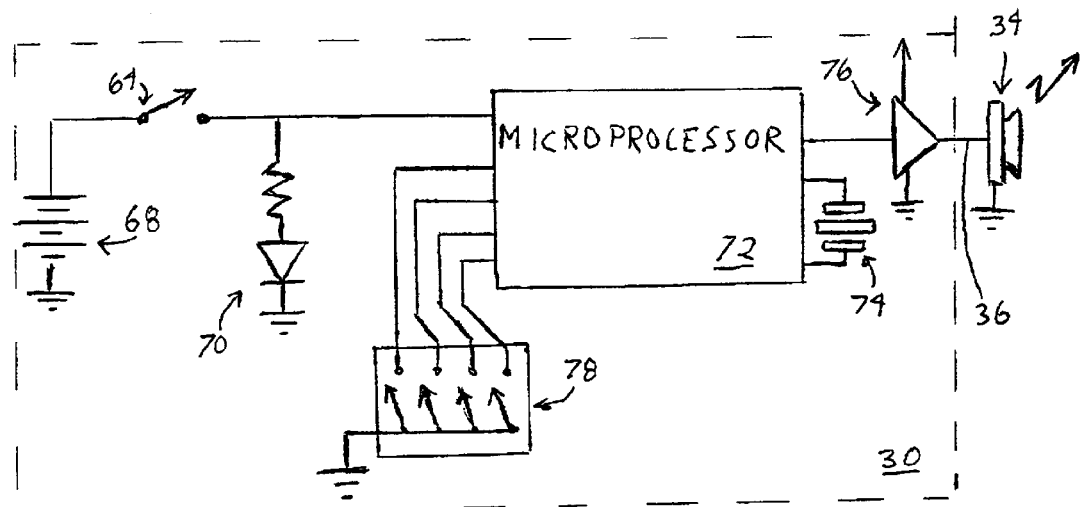
FIG. 6 is a schematic diagram of the transmitter and emitter components of the system of the invention.

FIG. 6 shows the electronic components of the transmitter subsystem 12 and their interconnections in detail. The transmitter subsystem 12 preferably includes a battery 68 electrically connected to the on-off switch 64 and an on indicator light or battery power light 70 for indicating that the battery power is sufficient to power the subsystem 12. The subsystem 12 also preferably includes a microprocessor 72 connected to a crystal resonator 74 for providing a signal of a desired frequency. The desired frequency is preferably in the range of ultrasonic frequencies, but it may alternatively be in the range of subsonic frequencies or even in the range of human hearing, if desired. The microprocessor 72 is connected to a signal amplifier 76 which receives the electrical signal therefrom and amplifies it sufficiently to power the emitter or output transducer 34 which emits preferably an ultrasonic signal therefrom. The subsystem 12 also preferably includes a coded pattern selector 78 for providing unique I.D. tones. The coded pattern selector 78 is connected to the microprocessor 72 for encoding the signal preferably making it a pulsed signal. This selector 78 allows the subsystem 12 to have a select and unique sonic signal output 38 to distinguish that signal output from that of other such systems 10 that may be used nearby. This allows the system 10 to be used simultaneously in the same general location as other such systems without interference therebetween.

Figure 7:
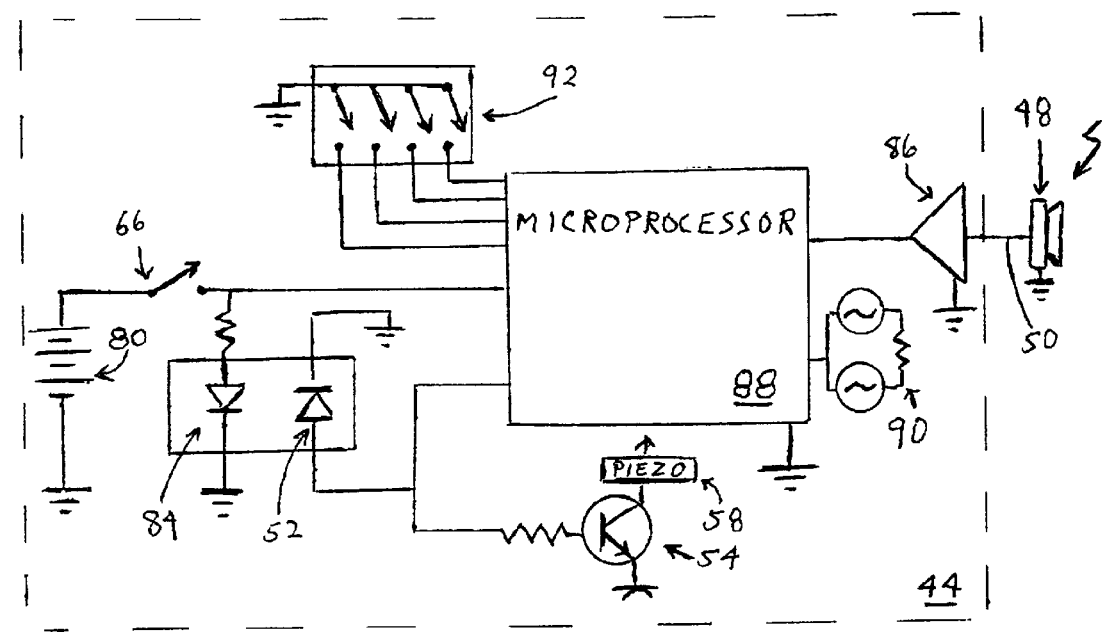
FIG. 7 is an schematic diagram of the receiver, pickup and indicator components of the system of the invention.

FIG. 7 shows the electronic components of the receiver subsystem 14 and their interconnections in detail. The receiver subsystem 14 preferably includes a battery 80 electrically connected to the on-off switch 66 and an on indicator light of battery power light 84 for indicating that the battery power is sufficient to power the subsystem 14. The indicator light 84 is preferably a single bi-color type of led so that a green color emission indicates satisfactory battery condition while a red color emission indicates signal receipt by the receiver subsystem 14. However, there may instead be two different indicator lights used for these two functions rather than one, if desired. The pickup or input transducer 48 of the subsystem 14 receives the sonic signal 38 and converts it to an electrical signal and transmits it to an amplifier/waveform shaper 86 which amplifies and processes the signal thereby filtering out noise and feeds it to a microprocessor 88 connected to an oscillator resistor combination circuit 90 for frequency matching the incoming signal. The microprocessor 88 is connected to both the led indicator 56 and the audio indicator 58 for providing an output thereto which activates them in response to signal receipt by the microprocessor 88. The subsystem 14 also preferably includes a coded pattern selector 92 for providing unique I.D. tones which are the same as those of the coded pattern selector 78 of the subsystem 12. The coded pattern selector 92 is connected to the microprocessor 88 for decoding the signal. This selector 92 allows the subsystem 12 to respond to a select and unique signal output which is preferably that chosen via the selector 78 of subsystem 12 to distinguish that signal input from that of other such systems 10. When used in conduction with the similar coded pattern selector 78 of subsystem 12, this allows the system 10 to be used simultaneously in the same general location as other such systems without interference therebetween.

Accordingly, there has been provided, in accordance with the invention, a conduit end identifier system which provides ease of use with single person operation as well as being safer to use than conventional systems and methods. It is to be understood that all the terms used herein are descriptive rather than limiting. Although the invention has been described in conjunction with the specific embodiment set forth above, many alternative embodiments, modifications, and variations will be apparent to those skilled in the art in light of the disclosure set forth herein. Accordingly, it is intended to include also all the alternatives, embodiments, modifications and variations that fall within the spirit and scope of the invention as set forth in the claims hereinbelow.

What is claimed is:

1. A system for identifying the ends of a single selected conduit, comprising:

a transmitter for producing an electrical signal output;

an output transducer communicatingly connected to said transmitter for converting the electrical signal output to a sonic signal and for emitting the sonic signal therefrom;

means for directing emission of the sonic signal into one of the ends of the conduit for transmission of the sonic signal through the conduit, said means for directing including an output wand interconnecting said transmitter and said output transducer, said wand having a degree of flexability sufficient to allow said output transducer to be movable relative to said transmitter and to allow said output wand to be bent into desired shapes and orientations to facilitate proper positioning of said output transducer at the one of the ends, said output wand having a degree of structural strength sufficient to allow said output wand to retain any of various of said desired shapes and orientations into which the wand is bent in order to hold said output transducer in a desired position at the one of the ends;

an input transducer for receiving the sonic signal and converting the sonic signal to an electrical signal input;

means for positioning said input transducer proximal to an opposite one of the ends of the conduit;

a receiver communicatingly connected to said input transducer for receiving the electrical signal input and distinguishing the electrical signal input from noise and producing a receiver output in response thereto;

an indicator communicatingly connected to said receiver and responsive to the electrical signal input for indicating receipt thereof for determining whether there is signal transmission between the one of the ends and the opposite one of the ends and thereby identify whether the one of the ends and the opposite one of the ends are end portions of the single selected conduit.

2. The system of claim 1 wherein said indicator includes a speaker for notifying a user of receipt of a desired signal from said transmitter.

3. The system of claim 1 wherein said output wand includes a coiled output structure at walls of said output wand to enable bending of said output wand and retention of said output wand in the any of various of said desired shapes and orientations and stand alone in said any of various of said desired shapes and orientations while said output transducer is spaced from said conduit and while said output transducer and said output wand are unattended.

4. The system of claim 1 wherein said output transducer is sized so that said output transducer is less than the inside thickness dimensions of a standard sized electrical wiring conduit so that the one of the ends can receive said output transducer therein and said output wand can retain said output transducer in a desired position in which said output transducer and said output wand spaced from said conduit.

5. The system of claim 1 wherein said transmitter is battery powered to facilitate positioning thereof proximal to the one of the ends.

6. The system of claim 5 wherein said transmitter is sufficiently compact and lightweight to facilitate manual positioning thereof proximal to the one of the ends.

7. The system of claim 1 wherein said means for positioning includes an input wand interconnecting said receiver and said input transducer, said input wand having a degree of flexibility sufficient to allow said input wand and said input transducer to be movable relative to said receiver and to allow said input wand to be bent into said desired shapes and orientations to facilitate proper positioning of said input transducer at the opposite one of the ends, said input wand having a degree of structural strength sufficient to allow said input wand to retain any of various of said desired shapes and orientations into which the input wand is bent in order to hold said input transducer in a desired position at the opposite one of the ends.

8. The system of claim 7 wherein said input wand includes a coiled input structure at walls of said input wand to enable bending of said input wand and retention of said input wand in the any of various of said desired shapes and orientations and stand alone in the any of various of said desired shapes and orientations while said input transducer is spaced from said conduit and while said input transducer and said input wand are unattended.

9. The system of claim 7 wherein said input transducer is sized so that said input transducer is less than the inside thickness dimensions of a standard sized electrical wiring conduit so that the opposite one of the ends can receive said input transducer therein and said input wand can retain the input transducer in a desired position in which said input transducer and said input wand are spaced from said conduit.

10. The system of claim 1 wherein said receiver is battery powered to facilitate positioning thereof proximal to another one of the ends of another conduit in a multiplicity of conduits.

11. The system of claim 10 wherein said receiver is sufficiently compact and lightweight to facilitate manual positioning thereof proximal to said opposite one of the ends.

12. The system of claim 1 wherein said sonic signal is at a selected frequency which is outside the range of frequencies generated by equipment typically in use at a building construction site.

13. The system of claim 1 wherein said sonic signal is encoded with a distinct pattern making said sonic signal distinct from extraneous signals.

14. The system of claim 13 wherein the pattern is pulsed.

15. The system of claim 13 wherein said receiver includes a waveform shaper for filtering out extraneous noise.

16. The system of claim 13 further including a means for selecting a desired one of a plurality of distinct patterns said plurality of distinct patterns distinct from each other.

17. The system of claim 16 wherein said means for selecting includes a transmitter coded pattern selector integral with said transmitter for manually selecting a desired one of said plurality of distinct patterns and a receiver coded pattern selector integral with said receiver for manually selecting a desired one of said plurality of distinct patterns for allowing simultaneous use of a plurality of the systems for identifying ends of a conduit of a plurality of conduits in which each of the plurality of systems has a coded pattern signal which is distinct from that of other of the plurality of systems.

18. The system of claim 1 wherein said means for directing is composed of an electrically insulating material.

19. The system of claim 1 wherein said means for positioning is composed of an electrically insulating material.

20. The system of claim 1 wherein said indicator includes an led connected to said receiver for visually notifying a user of receipt of the sonic signal from said transmitter.

* * * * *